United States Patent [19]

Feger et al.

[11] Patent Number: 5,685,628
[45] Date of Patent: Nov. 11, 1997

[54] LIGHTING DEVICE IN PARTICULAR SIGNALLING LAMP FOR A VEHICLE

[75] Inventors: Rolf Feger, Bietigheim-Bissingen; Gunther Holzmacher, Asperg, both of Germany

[73] Assignee: ITT Automotive Europe GmbH, Germany

[21] Appl. No.: 428,192

[22] PCT Filed: Oct. 1, 1993

[86] PCT No.: PCT/EP93/02690

§ 371 Date: Jul. 7, 1995

§ 102(e) Date: Jul. 7, 1995

[87] PCT Pub. No.: WO94/09310

PCT Pub. Date: Apr. 28, 1994

[30] Foreign Application Priority Data

Oct. 20, 1992 [DE] Germany .......................... 42 35 289.4

[51] Int. Cl.⁶ .................................................. B60Q 1/00
[52] U.S. Cl. ........................... 362/61; 362/80; 362/267
[58] Field of Search ........................... 362/61, 80, 267, 362/369, 390; 277/12, 180, 181

[56] References Cited

U.S. PATENT DOCUMENTS

| 2,910,577 | 10/1959 | Bolmeyer | 362/267 |
| 4,633,032 | 12/1986 | Oido et al. | 136/251 |
| 4,695,928 | 9/1987 | Schauwecker et al. | 362/267 |
| 4,854,636 | 8/1989 | Greenhalgh et al. | 362/61 |
| 4,912,606 | 3/1990 | Yamamoto | 362/61 |
| 5,001,610 | 3/1991 | Otaka | 362/61 |
| 5,149,169 | 9/1992 | Nozaki | 362/80 |

FOREIGN PATENT DOCUMENTS

| 2253050 | 9/1983 | France . | |
| 1186352 | 1/1965 | Germany . | |
| 8714177 | 3/1987 | Germany . | |
| 4011642 | 5/1991 | Germany . | |
| 04050049 | 2/1992 | Japan . | |
| 2069122 | 8/1981 | United Kingdom | 362/61 |

OTHER PUBLICATIONS

Patent Abstracts of Japan, vol. 16, No. 325 (M-1257)(5278) 29 May 1992.

Primary Examiner—Alan Cariaso
Attorney, Agent, or Firm—J. Gordon Lewis; Thomas N. Twomey

[57] ABSTRACT

A lighting device, in particular to a signalling lamp for a vehicle, which consists of a lamp housing and of a cover plate which is connected therewith and is translucent at least in some areas. The lighting device is mountable on a wall or the like, and a gap which forcibly results from design, which provides an unesthetic view to a beholder, and which is formed between the lighting device and an adjacent wall has to be covered in a decorative manner.

12 Claims, 5 Drawing Sheets

LIGHTING DEVICE IN PARTICULAR SIGNALLING LAMP FOR A VEHICLE

TECHNICAL FIELD

This invention generally relates to a lighting device, in particular to a signalling lamp for a vehicle, which consists of a lamp housing with a cover plate which at least in some areas is translucent.

BACKGROUND OF THE INVENTION

It is a general demand for such lighting devices to feature a decorative harmony with their immediate surroundings. Thus a beholder would dislike the sight of inattractive lamp housing surfaces and spaces or rather gaps between the lighting device and the adjacent wall. Additionally, there may result adverse effects on the air resistance of vehicles due to gaps in the outer surface of the vehicle body.

Various seals, mostly of the elastic type, are used for covering such spaces in the form of gaps or the like. These seals are held on the lighting device at least until the same is mounted on the corresponding mounting wall. The seals are generally fastened to the lighting device by gluing, clamping, clicking-in, by placing them on a rib or by foaming. The main function of these known seals, however, is to protect the areas or parts lying behind the housing against any penetration of dirt, water, aggressive agents etc.

DE 29 45 733 C2 describes a vehicle lamp with several bulbs. This vehicle lamp has a reflector body which essentially forms the lamp housing with several light chambers. A groove-type flange with a sealing ring foamed into the same extends on the outer edge of the reflector body which is adjacent to the cover plate. Apart from the fact that foamed seals in general will not impart an exactly decorative impression to the beholder, this particular version lacks a harmonious transition between the light and the metal part of the vehicle body. As compared with the outer edge of the light, the seal is placed relatively far back so that there remains a clearly visible joint between the light and the vehicle body.

DE 31 01 398 A1 likewise refers to a multi-chamber light for vehicles. This light is shut off towards the front by means of a cover plate composed of a plate and of a decorative frame. The decorative frame has two ribs placed towards the rear at different spacings with regard to the outer edge. In this area, a seal is inserted which in part is located in the area between the two ribs and which with the other part reaches over the outer rib. Due to this arrangement, the seal is kept in its position until the light is mounted. Afterwards, the metal of the vehicle body serves as a back rest. According to another embodiment the seal may also be the foamed-in type. In the described case, this seal is mainly to perform sealing functions. It does not serve any decorative purposes.

DE 34 05 962 C2 deals with a blinker inserted into a vehicle body. In this case, a rubber sealing lip is glued to a circumferential edge of the plastic housing. This sealing lip extends away from the plastic housing and rests with its lip edge against an adjacent metal part of the vehicle body. The main duty of this sealing lip is to protect an intermediate space between the lamp housing and the wall of the vehicle body against any penetration of water, dirt and aggressive agents. With respect to the outer edge of the vehicle body or of the light, the sealing lip is placed relatively far back which renders a relatively deep furrow. Thus, the decorative value of this sealing lip is not exactly good. Apart from that, gluing elastic seals is laborious and expensive.

DE 32 09 393 A1 describes a front blinker of automotive vehicles. A rubber seal is inserted into the area between the lamp and the adjacent area of the vehicle body. This seal is not closed in itself. The two end parts of the seal are provided with a hook engaging a shoulder of the housing from behind. Because of the tension produced in the longitudinal direction of the seal the same comes to rest against the blinker. In addition, two ribs form a groove engaged by an undercut section of the seal. The cross-section of the seal is U-shaped, one of the legs resting against the light and the other leg resting against the vehicle body. The connecting part of the U points outwards and covers the gap between the light and the vehicle body. This seal seems to be able to produce a nice and decorative impression besides its sealing function. However, mounting this seal on the light is quite expensive and it remains questionable whether mounting the seal can be automated.

It is an object of this invention to equip a lighting device of the type referred to above, in particular a signalling lamp mountable on the body of a vehicle, by way of machines with means that ensure a decorative masking for a space between the lighting device and its adjacent wall and/or for outer surfaces of the lamp housing lying in the visual range of the beholder.

According to this invention, this object is solved by means of injection moulding, an elastic element of plastics is applied to a lighting device. This elastic element can fill or bridge the space between the lighting device or rather between the part of the lighting device and an adjacent wall at least in terms of the visual impression that is imparted to the beholder.

Injection is machine-made by way of injection moulding and ensures economic large-scale production while adhering to an exact shape and exact positioning of the elastic element on the lighting device. The elastic element is able to compensate any tolerances in the space between the lighting device and an adjacent wall and to act as a decorative masking.

Its decorative value as a masking will be enhanced if the elastic element at least on the visible outer surface passes over harmoniously from the lighting device to the adjacent wall. The elastic element can be injection-moulded on an edge of the lamp housing and surround the lighting device completely. However, if, for instance, one side of the lighting device is already arranged without almost any space with regard to some part or is in some other way to be arranged in a decorative and pleasing manner the elastic element will only be injection-moulded on the remaining sides on an edge of the lamp housing.

Preferably the elastic element has a masking lip which extends from the lighting device in the direction of the adjacent wall with which the space is formed. This lip configuration provides savings in material. On the other hand, due to this lip shape it is possible to improve elasticity when a somewhat stiffer material is used. A sufficient elasticity, on its part, is again an advantage for mounting the lighting device and for bridging, at least in visual terms, the space or rather the gap, with certain tolerances being able to be compensated without any disturbing influences on a harmonious appearance.

A particularly pleasing visual impression will be achieved by a mounted lighting device where the masking lip of the elastic element injection-moulded on the edge of the lamp housing extends from the edge of the cover plate as far as the adjacent wall. That means that the masking lip rests on the outer edge of the cover plate and on the adjacent wall, thus covering the space between these two parts. This even renders an additional sealing function against penetration of dirt, humidity etc. apart from the pleasing decorative effect.

Injection-moulding the elastic element on the lamp housing will effect a cross linkage at the contact surface of the elastic element and the lamp housing, the result of this cross linkage being the adhesion of the elastic element on the lamp housing. In general, the adhesive strength is sufficient to hold the injection-moulded element reliably. In the possible event of a housing edge of very complicated shape (or in case of complicated geometrical assembly conditions or if the chosen material combination does not render such a good cross linkage) it is possible to provide an injection-moulding surface of the lamp housing with additional means for anchoring the elastic element. These additional anchoring means can be any pins (e.g., pin 29 in FIG. 7) or cams or such projections moulded integrally to the lamp housing and projecting from the injection-moulding surface. These pins can project through the material of the elastic element and be caulked like rivets on the surface of the same. Caulking may have been done in the injection mould, simultaneously with injection moulding. In case of complicated conditions these additional anchoring means will thus provide additional safety regarding fastening the elastic element with masking lip to the lamp housing.

To ensure a pleasing decorative masking for a lighting device (which masking is to be machine-provided for outer surfaces of the lamp housing that lie in the visual range of a beholder) this invention suggests that at least the outer surfaces of the lamp housing that lie in the visual range are coated by means of a decorative plastic coating to be applied by means of injection moulding. A very economic production of this plastic coating is possible in large numbers and in consistent quality by means of injection moulding and this plastic coating will feature a very good adhesion on the lamp housing because of the cross-linking process in the area of contact. Coloration is adaptable to any existing wishes in a simple manner by dyeing the coating material or by using a coating material of the desired color. By drawing the plastic coating around an edge of the lamp housing up to and on an adjacent outer surface or adjacent front edge, it is possible to even increase or enhance the visual or rather decorative effect of the plastic coating. This operation will procure harmonious transitions.

In order to ensure that the plastic coating will feature a good and permanent adhesion on the lamp housing even in case of relatively large-area injection mouldings, the plastic coating should at least in some areas extend around a front edge of the lamp housing up to and on a back side of the wall of the lamp housing which is opposite to the injection-moulded outer surface. The fact that coating material passes through at least one opening in the wall of the lamp housing, completely fills this opening and thus integrally unites the parts of the plastic coating that lie on the outer surface with the parts of the plastic coating on the back of the lamp housing wall will render enhanced safety with regard to the adhesive strength of the plastic coating. This could be of importance in case the injection-moulded surfaces are relatively large and do not feature any anchoring points of their own.

Lighting device of this type can be required mask a gap and an adjacent wall and be decorative in design or in color. This can be done in that the lighting device of the present invention. An advantageous variant of such a lighting device is that an elastic element of plastic is applied to a part of the lamp housing by means of injection moulding, which element comprises a masking lip extending from the lighting device up to an adjacent wall. When assembled, the masking lip can rest on an adjacent wall in an extended or sheet-type manner. In addition, a decorative plastic coating of corresponding colour is injection-moulded on the surfaces of the lamp housing which lie in the visual range. It is desirable for the elastic element or rather the masking lip and the plastic coating to display the same color. This will render a harmonious overall appearance and will simplify production considerably.

In practice, it may occur that the lamp housing has a relatively rugged and complicated shape. There may thus be a housing wall whose outer surface lies in the visual range and forms a space (e.g., by means of its front edge) with an adjacent wall, which sight is to be covered visually in a decorative manner. In such a case it is advantageous if the elastic element with masking lip and the plastic coating are integrally united at least in the area concerned. In this case, the plastic coating and the elastic element with masking lip form a unit in physical and visual terms.

There will result further advantages if the color of the lamp housing is gray and the colour of the elastic element and/or of the plastic coating is black and if the lamp housing is of ABS (acrylonitrile-butadiene-styrene) and the elastic element and/or the plastic coating is of TPE (thermoplastic elastomer) or TPU (thermoplastic urethane-based elastomer). The black color of the elastic element and/or of the surfaces of the lamp housing that lie in the visual range is preferred because the same can be combined in terms of decorative effectiveness with almost any other color, meaning that it is neutral. On the other hand, a gray color of the lamp housing is desired particularly in case of lights where the cover plate is welded to the lamp housing. With a gray lamp housing material, the unshapely welding flashes forming during welding will blend with the cover plate. In case of a black lamp housing material the welding flashes would heavily contrast and be [feature an] unesthetic. Due to this invention, there results a lighting device which at the same time has relatively unobtrusive welding flashes and features the desired black coloration of the visible housing surfaces while the elastic element and the plastic coating allow cost-effective production.

The material combination of ABS for the lamp housing and of TPE or rather TPU for the elastic element and the plastic coating is very advantageous for a good adhesion of the injection mouldings on the lamp housing.

The lamp housing with injection-moulded elastic element and/or injection-moulded plastic coating is preferably produced by means of two-component injection moulding. This enables a very cost-effective production of the lighting device and it is possible to ensure an unchanging high-standard quality.

In the following, this invention will be described in more detail, reference being made to an example of an embodiment which refers to a multi-chamber tail light of a motor vehicle.

DETAILED DESCRIPTION OF THE PREFERRED EMBODIMENTS

Figure 1:
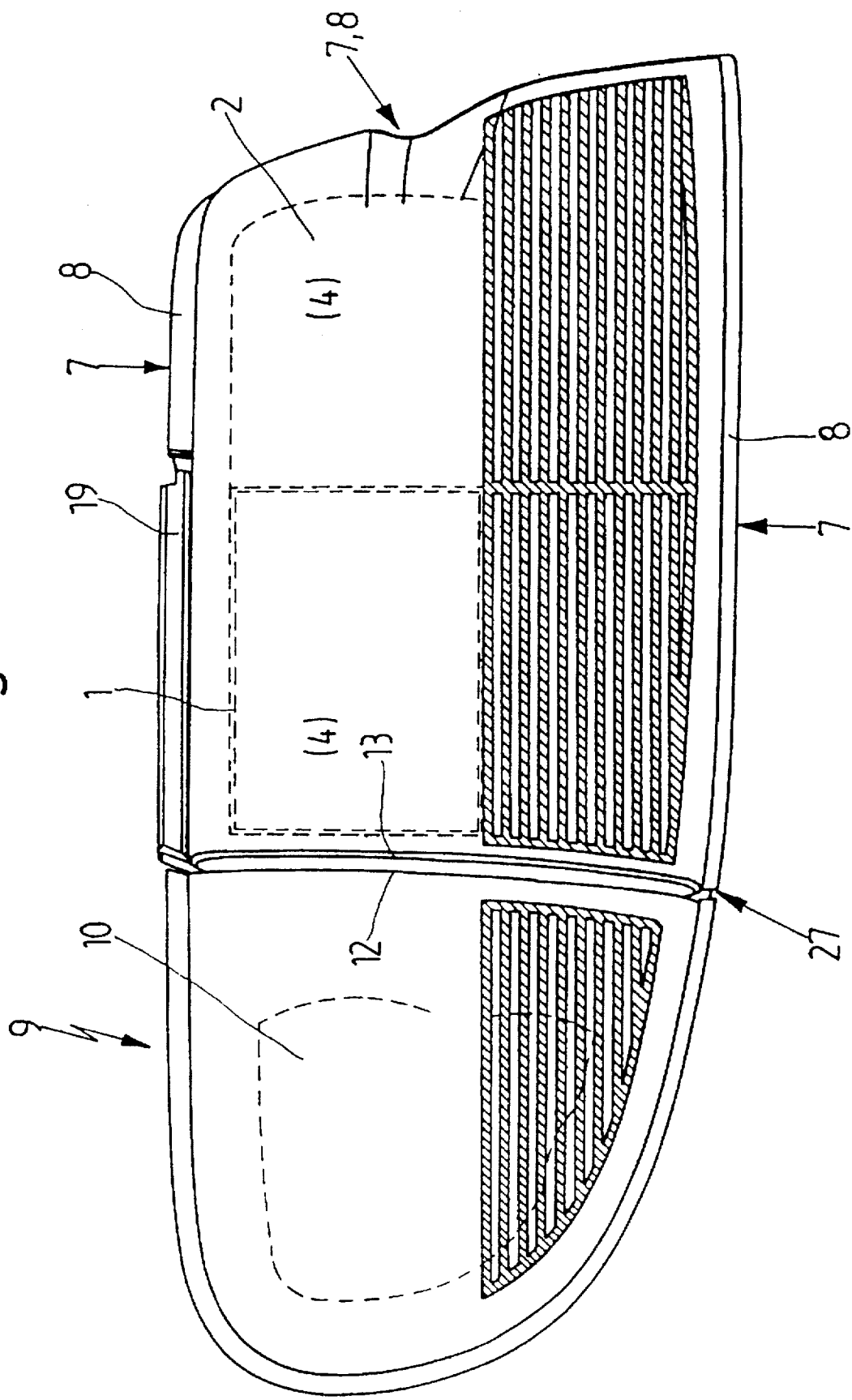
FIG. 1 is a multi-chamber tail light of a motor vehicle, completed by a separate fog tail lamp.

The inventive multi-chamber tail light consists of a lamp housing 1 and of a cover plate 2. The lamp housing 1 is produced by injection moulding. It is made of ABS (acrylonitrile-butadiene-styrene) and its colour is gray. As the lamp housing is destined for assembly in the rear part of the body 3 of a motor vehicle its shape or rather contours are adapted to the corresponding part of vehicle body 3. The cover plate 2 consists of two plastic layers and features the transparency and coloration in the areas of the individual light chambers 4 which correspond to the functions of the respective light chamber 4. In the area of the reflector, the cover plate 2 is equipped or underlaid with the corresponding reflecting means and thus is at least in some areas impervious to light. The cover plate 2 is welded to the lamp housing 1.

By means of a lamp holder 5 (FIG. 4) several bulbs 6 may be inserted or can be introduced into the light chambers 4 from the back side of the lamp housing 1 with corresponding coordination, with the lamp holder 5 being held detachably on the lamp housing 1 in a manner known.

In order to cover a gap forcibly resulting from manufacture and formed by a space between the outer edge of the tail light and the adjacent wall of the vehicle body 3, which space in general is additionally tolerance-fraught, in a manner which at least in visual terms will impart a decorative impression to the beholder, an elastic element 7 of black TPE (thermoplastic elastomer) is applied in the respective areas to the outer edge of the lamp housing 1 by means of injection moulding. This elastic element 7 comprises a masking lip 8 which extends from the multi-chamber tail light in the direction of the adjacent wall of the vehicle body 3. When mounted (FIG. 4), the masking lip 8 will rest both on the outer edge of the cover plate 2 and on the adjacent wall of the vehicle body 3. Thus, a harmonious transition will be procured between the multi-chamber tail light and the vehicle body 3 which is of advantage for the overall visual impression.

Even if the masking lip 8 would not rest on the adjacent wall of the vehicle body 3, i.e., if it would stop slightly off the vehicle body 3 the beholder's impression would be as if the gap between the tail light and the vehicle body 3 were covered.

Besides the multi-chamber tail light, FIG. 1 features an additional separate fog tail lamp 9. This fog tail lamp 9 has a lamp housing whereon a red translucent cover plate 10 is welded on. A bulb is inserted or rather introduceable into the lamp housing of the fog tail lamp 9 from the back of the same. The fog tail lamp 9 is to be mounted in the rear part of the motor vehicle on the boot flap 11 or rear door of the same so that, with the boot flap 11 closed, one side 12 of the fog tail lamp 9 lies at a close distance near a side 13 of the multi-chamber tail light. The visible parts or rather contours of the fog tail lamp 9 and of the multi-chamber tail light feature an almost mirror-symmetrical design so that, there will result the impression of one sole tail light when looking from a certain distance. Consequently, there is no injection-moulded elastic element 7 or rather no masking lip 8 on sides 12 and 13 of the fog tail lamp 9 and of the multi-chamber tail light, respectively.

The lamp housing 1 has a plurality of outer surfaces 14, 15, 16, 17, 18, 19 which are visible to a beholder under certain circumstances and which therefore are to have a decorative aspect harmoniously integrating itself into the overall appearance. Regarding this embodiment, the outer surfaces 14 through 18 are visible only when the boot flap 11 is open whereas outer surface 19 is visible when looking at the rear part of the motor vehicle, even with the boot flap 11 closed. The positions of these visible outer surfaces 14 through 19 can be seen in FIGS. 2 and 3. According to this invention, a plastic coating 20 of black TPE (thermoplastic elastomer) is applied to these surfaces 14 through 19 by means of injection moulding. As all outer surfaces 14 through 19 are adjacent to each other, the plastic coating 20 will in each case advantageously extend around an edge (e.g., edge 28 in FIG. 6) of an outer surface up to and on an adjacent outer surface. The outer surfaces 14 through 19 are thus coherently covered by one sole injection-moulded plastic coating. The plastic coating 20 forms a matted black rubber-type surface giving the outer surfaces 14 through 19 of the lamp housing an unobtrusive, pleasing appearance which is decoratively integrated into the overall appearance.

Figure 6:
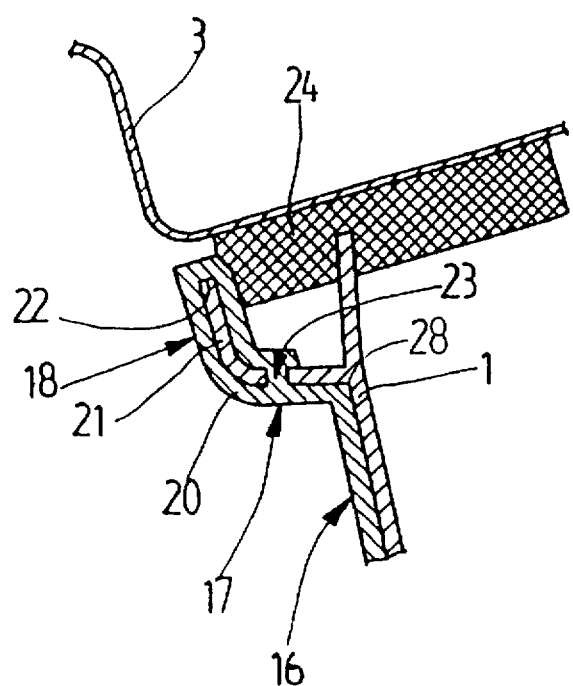
FIG. 6 is detail B of FIG. 4 in enlarged representation.
Figure 7:
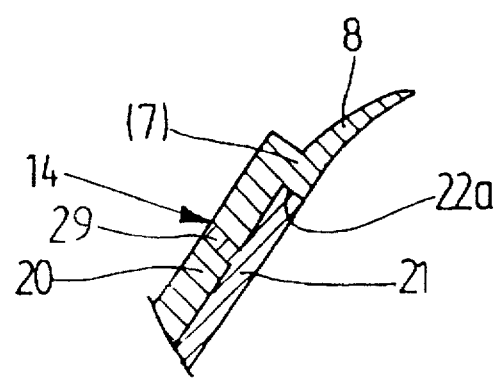
FIG. 7 is a section I—I of FIG. 2 in enlarged representation.

Each of the outer surfaces 14 through 19 is located on a lamp housing wall 21 which at least has one free front edge 22, 22a. The plastic coating 20 advantageously extends up to and on these front edges 22, 22a which enhances the reliability of the adhesion of the plastic coating 20. At least in some areas, as can be seen in FIGS. 6 and 7, the plastic coating 20 is injection-moulded around up to and on the back side of the lamp housing wall 21. In order to improve the adhesion of the plastic coating 20 even further, there are openings 23 at certain points in the lamp housing wall 21. The coating material that has passed through these openings 23 will thus integrally unite the part of the plastic coating 20 on the outer surface with the part of the plastic coating on the back side of the lamp housing wall 21.

Figure 2:
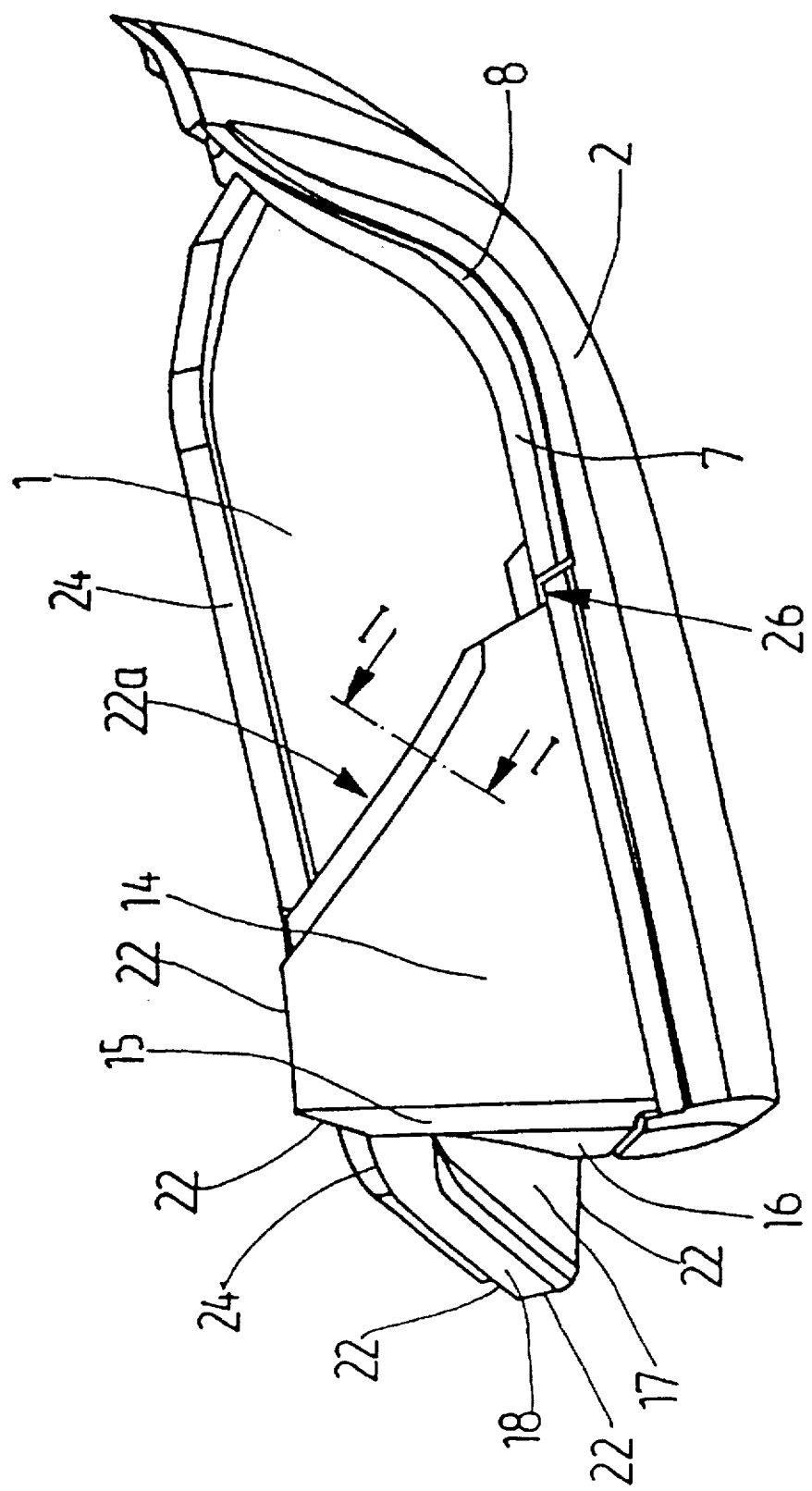
FIG. 2 is a plan view of the multi-chamber tail light of FIG. 1, yet without fog tail lamp.
Figure 3:
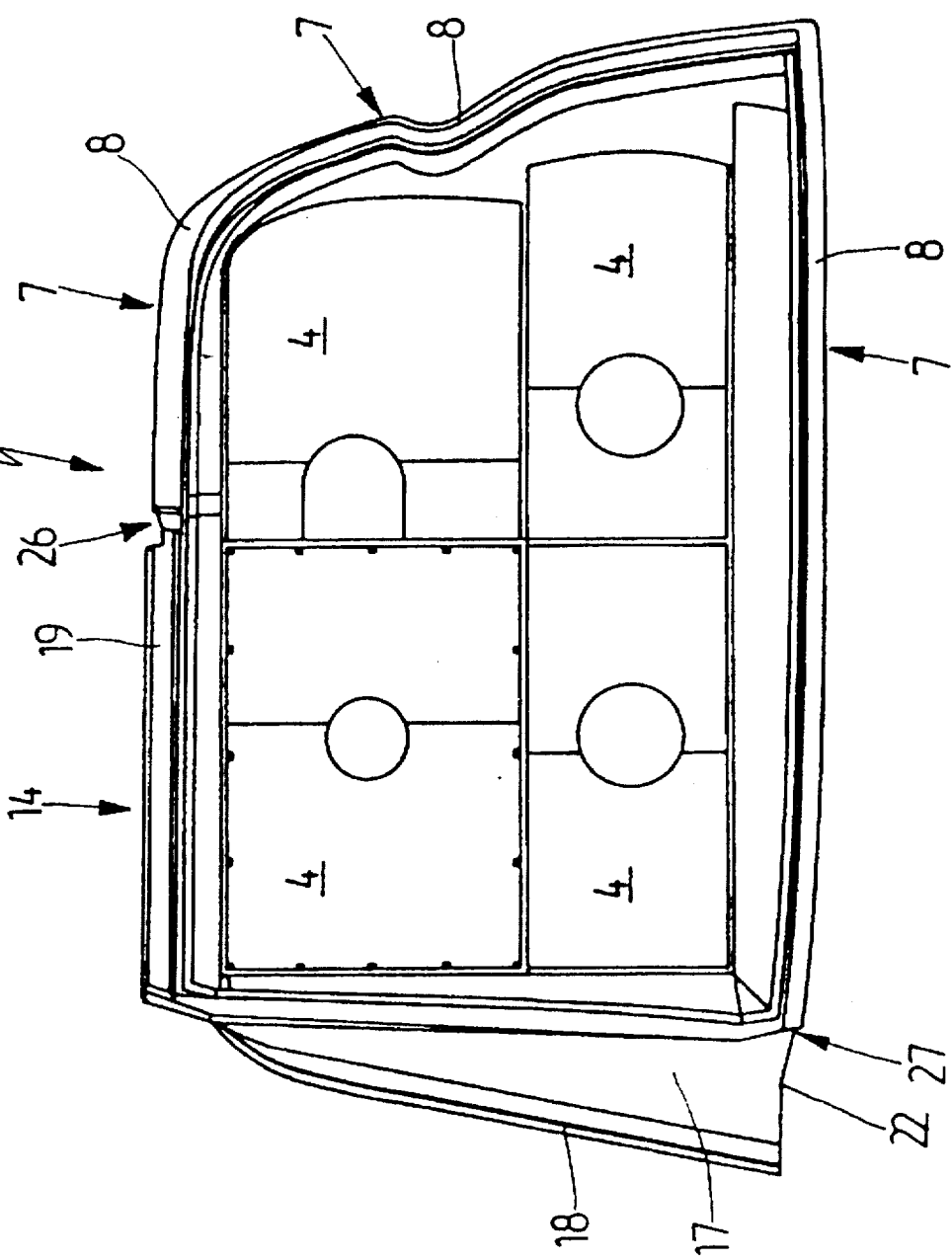
FIG. 3 is a housing of an inventive multi-chamber tail light with injection-moulded masking lip and injection-moulded plastic coating.

In FIG. 2 the outer surface 14 of the lamp housing 1 is clearly discernible. When the tail light has been assembled this outer surface 14 located on a lamp housing wall 21 will extend in an almost horizontal manner. In the assembled condition of the tail light, the front edge 22a of this lamp housing wall 21 will likewise be situated at a distance with regard to a wall of the vehicle body 3. The gap thus formed would be visible to the beholder, as would be the outer surface 14, in case of an open boot flap 11. This is the reason for quasi injection-moulding an elastic element 7 with masking lip 8 also on this lamp housing wall 21 in the area of the front edge 22a. As a plastic coating 20 is injection-moulded on the outer surface 14 the elastic element 7 with masking lip 8 and the plastic coating are advantageously united so as to be integral in this area. This is possible since the plastic coating 20 and the elastic element 7 with masking lip 8 are of the same material. Of course, this will considerably simplify manufacture as all plastic parts can be injection-moulded in one sole operation.

Adopting a different approach, it is also possible to proceed on the assumption that the plastic coating 20 on the outer surface 14 extends up to and on the front edge 22a and that, in this area, a masking lip 8 is directly moulded integrally to the plastic coating 20. In this case, a part of the plastic coating would at the same time take over the function of the elastic element 7.

Figure 4:
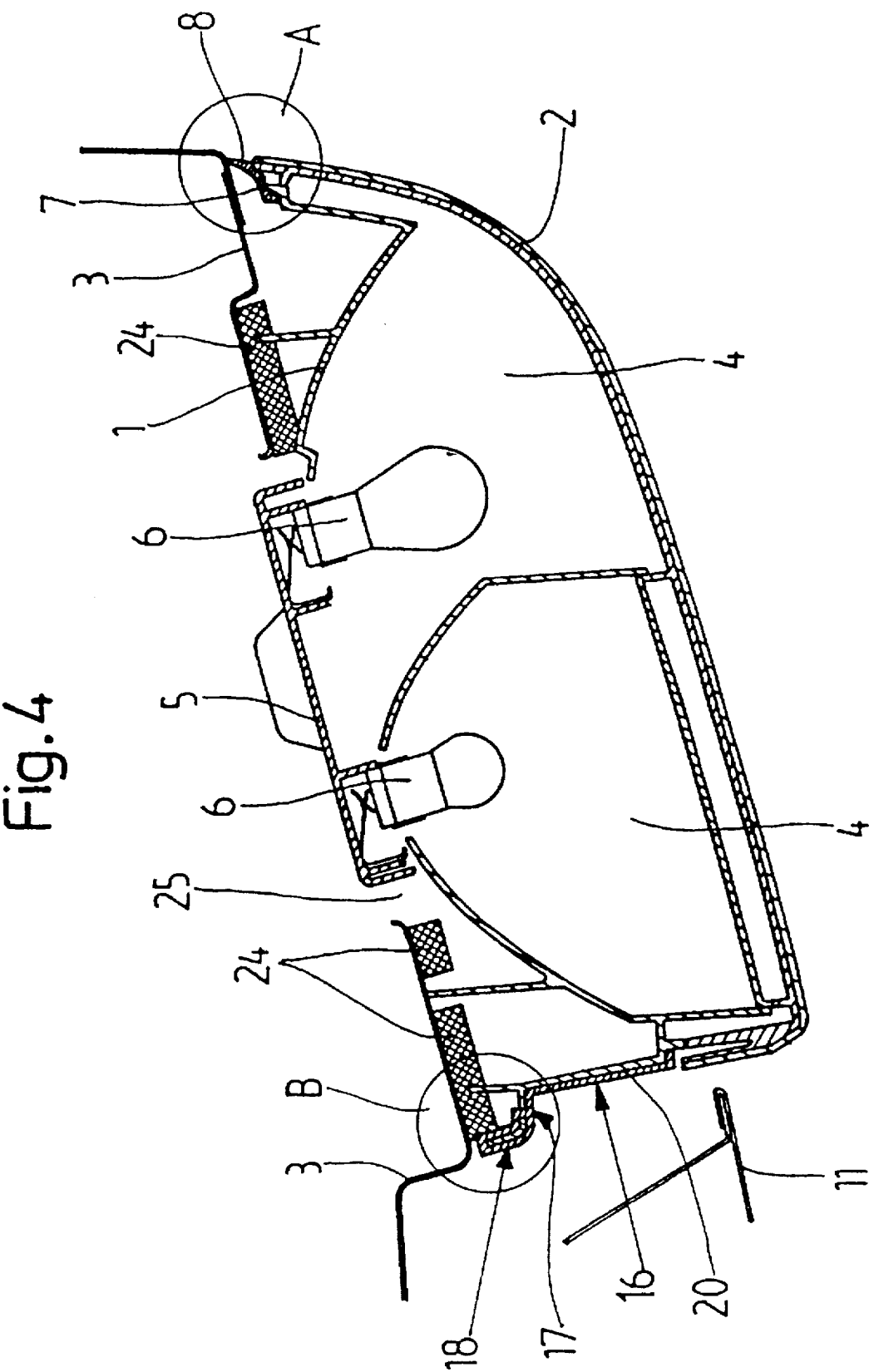
FIG. 4 is a horizontal section through an inventive multi-chamber tail light mounted on the body of a motor vehicle.
Figure 5:
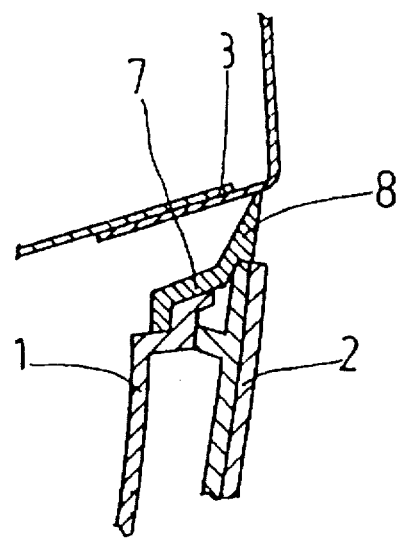
FIG. 5 is detail A of FIG. 4 in enlarged representation.

From FIG. 4 it can also be seen that there is an extra sealing element 24 between the areas of the back side of the lamp housing 1 and the vehicle body 3. The duty of this sealing element 24 is to protect back side areas of the multi-chamber tail light and the aperture 25, which is provided in the wall of the vehicle body 3 and is required for the assembly of the tail light, against any penetration of humidity, dust, dirt, aggressive agents and the like. The elastic element 7 or rather the masking lip 8 thus does not really have to perform any sealing function. However, there are areas where the elastic element 7 or rather the masking lip 8 rests both on the multi-chamber tail light and on the vehicle body 3. In these areas, there will thus result an additional sealing action by means of the elastic element 7 or the masking lip 8, respectively.

The elastic element 7 with masking lip 8 and the plastic coating 20 pass directly over into each other at point 26 on the upper edge and at point 27 on the corner formed by the lower edge and side 13 of the multi-chamber tail light. They are thus likewise united integrally in these spots 26, 27.

It may further be pointed out that this inventive multi-chamber tail light for a motor vehicle is particularly cost-effective since the lamp housing 1 with injection-moulded elastic element 7 with masking lip 8 and/or with injection-moulded plastic coating 20 is manufactured by means of a two-component injection moulding process.

We claim:

1. A lighting device for a vehicle comprising;
   a lamp housing mountable on a wall of said vehicle and provided with a cover plate which at least in some areas is translucent, with at least one light source being arranged or arrangeable in the lamp housing and, wherein a gap is defined between said lamp housing and a portion of said wall of the vehicle adjacent said housing when said lighting device is mounted to said vehicle,
   wherein an elastic element of plastics is injection-moulded on an edge of the lamp housing, said elastic element substantially masking said gap relative to a visual impression imparted to an observer of the vehicle wherein the elastic element has a masking lip which extends in a direction towards said adjacent portion of said wall.

2. A lighting device as claimed in claim 1, wherein the masking lip rests on an outer edge portion of the wall.

3. A lighting device for a vehicle comprising:
   a lamp housing mountable on a wall of said vehicle and provided with a cover plate which at least in some areas is translucent, with at least one light source being arranged or arrangeable in the lamp housing and, wherein a gap is defined between said lamp housing and a portion of said wall of the vehicle adjacent said housing when said lighting device is mounted to said vehicle,
   wherein an elastic element of plastics is injection-moulded on an edge of the lamp housing, said elastic element substantially masking said gap relative to a visual impression imparted to an observer of the vehicle wherein an injection-moulding surface of the lamp housing features additional anchoring means for the elastic element, said anchoring means comprising at least one of a pin and a cam.

4. A lighting device as claimed in claim 3, wherein the pins project through the material of the elastic element and are caulked on the surface of the elastic element.

5. A lighting device for a vehicle comprising:
   a lamp housing mountable on a wall, said lamp housing having a cover plate which at least in some areas is translucent, with at least one light source being arranged or arrangeable in said lamp housing, wherein said lamp housing includes a plurality of outer surfaces which lie in a visual range to thereby convey a decorative impression, and
   wherein a plastic coating is injection-moulded to at least one of said plurality of outer surfaces of said lamp housing which lie in the visual range, said plastic coating extending around a surface edge formed by a first one of said plurality of outer surfaces and a second one of said outer surfaces adjacent to said first one of said outer surfaces wherein said plastic coating extends from said first one of said outer surfaces up to and on said second one of said outer surfaces, said plastic coating, at least in some areas, extending on a first side of and around a front edge of a lamp housing wall up to and on a back side opposite said first side of said lamp housing wall,
   wherein at least one opening is provided in said lamp housing wall having a coating of injection-moulded plastic and in that coating material that has passed through this opening integrally unites the part of the plastic coating on the outer surface with the part of the plastic coating on the back side of the lamp housing wall.

6. A lighting device for a vehicle, comprising:
   a lamp housing mountable on a wall of the vehicle and provided with a cover plate which at least in some areas is translucent, with at least one light source being arranged or arrangeable in the lamp housing and, wherein a gap is defined between said lamp housing and a portion of said wall of the vehicle adjacent said lamp housing when said lighting device is mounted to said vehicle and wherein said lamp housing includes a plurality of outer surfaces which lie in a visual range destined to convey a decorative impression,
   wherein by means of injection-moulding, an elastic element of plastics is applied to a part of the lamp housing with the elastic element of plastics having a masking lip formed on a distal end thereof and has an elasticity associated therewith for substantially masking said gap and which extends from the lighting device in a direction of the adjacent portion of said wall and in that, by means of injection-moulding, a plastic coating is applied to at least one of said plurality of outer surfaces of the lamp housing which lie in the visual range.

7. A lighting device as claimed in claim 6, wherein the elastic element with masking lip and the plastic coating are integrally united.

8. A lighting device as claimed in claim 6, wherein the plastic coating extends up to and on a front edge of a lamp housing wall and in that, the masking lip is directly moulded integrally to the plastic coating.

9. A lighting device as claimed in claim 6, wherein the color of the lamp housing is gray and the color of the elastic element and the color of the plastic coating is black.

10. A lighting device as claimed in claim 6, wherein the lamp housing is of acrylonitrile-butadiene-styrene and in that the elastic element and the plastic coating is selected from the set of thermoplastic elastomer and thermoplastic urethane-based elastomer respectively.

11. A lighting device as claimed in claim 6, wherein the lamp housing with injection-moulded elastic element and with injection-moulded plastic coating is manufactured by means of a two-component injection-moulding process.

12. A lighting device as claimed in claim 6 wherein said masking lip is generally V-shaped.

* * * * *